(12) United States Patent
Steadman (10) Patent No.: US 10,063,716 B2
(45) Date of Patent: Aug. 28, 2018

(54) NETWORKED LOW-BANDWIDTH TERMINALS FOR TRANSMISSION OF IMAGERY

(71) Applicant: Textron Innovations Inc., Providence, RI (US)

(72) Inventor: Robert Lloyd Steadman, Mansfield, MA (US)

(73) Assignee: Textron Innovations Inc., Providence, RI (US)

( * ) Notice: Subject to any disclaimer, the term of this patent is extended or adjusted under 35 U.S.C. 154(b) by 61 days.

(21) Appl. No.: 15/229,812

(22) Filed: Aug. 5, 2016

(65) Prior Publication Data

US 2017/0041472 A1    Feb. 9, 2017

Related U.S. Application Data

(60) Provisional application No. 62/201,790, filed on Aug. 6, 2015.

(51) Int. Cl.
*G06K 9/00* (2006.01)
*H04N 1/00* (2006.01)
(Continued)

(52) U.S. Cl.
CPC ......... *H04N 1/00103* (2013.01); *F42C 13/00* (2013.01); *G06K 9/00* (2013.01);
(Continued)

(58) Field of Classification Search
CPC ........... H04N 21/2343; H04N 21/2365; H04N 21/6332; H04N 21/4122; H04N 21/4312; H04N 21/4314; H04N 21/4347; H04N 21/43615; H04N 21/4858; H04N 21/6377; H04N 21/654; H04N 21/658; H04N 7/181; H04N 1/00103; H04N 1/4115; H04N 2201/0039; F42C 13/00; G06K 9/00771;
(Continued)

(56) References Cited

U.S. PATENT DOCUMENTS

5,076,170 A * 12/1991 Seiple ...................... B63G 6/00
                                                        102/411
5,371,734 A * 12/1994 Fischer ............. H04W 52/0274
                                                        370/311
(Continued)

*Primary Examiner* — Aklilu Woldemariam
(74) *Attorney, Agent, or Firm* — BainwoodHuang (57) ABSTRACT

A system includes nodes deployable across an area and self-forming a mobile ad-hoc network. The nodes include (1) imaging circuitry for capturing an image of a local sub-area based on a triggering event, (2) image-transfer circuitry for partitioning a captured image into sub-images or image segments and transmitting them to other nodes, (3) image-transmission circuitry for transmitting a sub-image from another node on an uplink to a relay such as a satellite. The relay (1) receives transmissions of respective sub-images, in parallel on independent channels, from the nodes via respective uplinks, and (2) retransmits the sub-images to the remote location via a downlink. A central control station at the remote location (1) receives the sub-images from the relay via the downlink, (2) re-creates the captured image by combining the received sub-images, and (3) utilizes the re-created image in a monitoring or control operation of the central control station.

19 Claims, 6 Drawing Sheets

(51) Int. Cl.
*H04N 7/18* (2006.01)
*H04W 84/18* (2009.01)
*H04W 88/04* (2009.01)
*F42C 13/00* (2006.01)
*G06T 11/00* (2006.01)
*H04N 1/411* (2006.01)
*G08B 13/196* (2006.01)

(52) U.S. Cl.
CPC ..... *G06K 9/00771* (2013.01); *G06K 9/00979* (2013.01); *G06T 11/003* (2013.01); *H04N 1/4115* (2013.01); *H04N 7/181* (2013.01); *H04W 84/18* (2013.01); *H04W 88/04* (2013.01); *G06T 2207/10032* (2013.01); *G06T 2207/20132* (2013.01); *G06T 2207/30212* (2013.01); *G06T 2207/30232* (2013.01); *G08B 13/19656* (2013.01); *H04N 2201/0039* (2013.01); *H04N 2201/0043* (2013.01); *H04N 2201/0055* (2013.01)

(58) Field of Classification Search
CPC .. G06K 9/00979; G06K 9/00295; G06K 9/32; G06K 9/00369; G06K 9/00214; G06K 9/00362; G06K 9/00711; G06K 9/4628; G06K 9/50; G06K 9/6202; G06K 9/6256; G06K 9/6277; G06K 9/628; G06K 9/6296; G06T 11/003; G06T 2207/10032; G06T 2207/20132; G06T 2207/30212; G06T 2207/30232; G08B 13/19656; Y02B 60/50; H04B 1/713; H04B 17/0085; H04B 17/318; H04B 48/18; H04B 7/026; H04W 48/18; H04W 84/12; H04W 88/04; H04W 88/06; H04W 8/22; H04W 8/245; H04W 40/00; H04W 40/02; H04W 40/08; H04W 40/24; H04W 40/34; H04W 84/18; H04W 12/06; H04W 28/26; H04W 40/023; H04W 40/12; H04W 40/14; H04W 40/20; H04W 40/246; H04W 40/28; H04W 4/021; H04W 4/023; H04W 4/06; H04W 4/12; H04W 84/22; G01S 3/7865; H04J 13/0003; H04J 13/004; H04J 13/12; H04L 1/0077; H04L 2001/0097; H04L 27/2601; H04L 27/2602; H04L 27/2614; H04L 45/24; H04L 5/0021; H04L 1/0681; H04L 63/10; H04L 63/105
USPC ........ 382/103; 370/311, 348, 350, 310, 324, 370/329
See application file for complete search history.

(56) References Cited

U.S. PATENT DOCUMENTS

| | | | | |
|---|---|---|---|---|
| 6,295,367 | B1* | 9/2001 | Crabtree | G01S 3/7865 382/103 |
| 7,680,599 | B1* | 3/2010 | Steadman | G01V 1/223 702/14 |
| 9,414,239 | B2* | 8/2016 | Brunk | H04W 24/00 |
| 2004/0029553 | A1 | 2/2004 | Cain | |
| 2005/0063328 | A1* | 3/2005 | Dunagan | H04W 8/245 370/324 |
| 2007/0258508 | A1* | 11/2007 | Werb | H04W 84/18 375/140 |
| 2010/0142421 | A1* | 6/2010 | Schlicht | H04W 4/20 370/310 |
| 2012/0039284 | A1* | 2/2012 | Barbieri | H04W 48/10 370/329 |
| 2012/0063383 | A1* | 3/2012 | Barbieri | H04W 72/082 370/315 |
| 2012/0153740 | A1* | 6/2012 | Soar | F41H 1/02 307/104 |
| 2013/0157692 | A1 | 6/2013 | Hall et al. | |
| 2013/0196632 | A1* | 8/2013 | Horn | H04W 12/06 455/411 |
| 2013/0246576 | A1* | 9/2013 | Wogsberg | H04N 7/181 709/219 |
| 2014/0146924 | A1* | 5/2014 | Shattil | H04B 7/026 375/340 |
| 2015/0280888 | A1* | 10/2015 | Karsi | H04L 5/0073 370/329 |
| 2016/0021597 | A1* | 1/2016 | Hart | H04W 40/06 370/329 |
| 2017/0041472 | A1* | 2/2017 | Steadman | H04N 7/181 |
| 2017/0237795 | A1* | 8/2017 | Wogsberg | H04L 65/607 709/219 |
| 2017/0251515 | A1* | 8/2017 | Altman | H04W 76/045 |

* cited by examiner

NETWORKED LOW-BANDWIDTH TERMINALS FOR TRANSMISSION OF IMAGERY

BACKGROUND

This invention is generally in the field of networks and communications, and relates specifically to networks and communications used in connection with remote capture and transmission of imagery, for example in connection with unattended munitions and sensors.

This invention also relates to applications in which multiple nodes within a local area need to transmit data to a distant location. These include a cluster of remote unattended ground sensors (UGS), a field of unattended munitions or landmines, a group of robots, a swarm of unmanned air vehicles or drones, a unit of soldiers, or a convoy of vehicles as examples.

SUMMARY

One particular application of the disclosed technique is in the domain of antipersonnel landmines. Recent legal and political developments have effectively rendered conventional antipersonnel landmines obsolete. There is a need for a replacement that is more compatible with modern requirements including the Ottawa Treaty. Specifically, to avoid being defined as a (prohibited) landmine, any replacement requires involvement of a human with eyes on target to make an informed decision whether to apply a lethal effect against personnel. In some cases there are unique challenges because the munitions may be delivered very deep into hostile territory, well beyond visual over-watch and ordinary radio communication range. Bandwidth sufficient to support imaging with low latency is a key requirement. Satellite communications offers a potential solution, but ground terminals with the requisite bandwidth are too large, consume too much power, present a vulnerable single point of failure, and/or require line-of-sight to geosynchronous orbit satellites that is often unavailable.

A disclosed system can avoid or overcome such problems by combining the resources of many nodes in a given area equipped with low-bandwidth satellite terminals using a local short range radio network. In a landmine replacement application, a sufficient number of nodes are inherently available to support this concept. Although greatly limited in bandwidth compared geosynchronous satellite communication systems, low earth orbit systems function well with simple omnidirectional antennas making them practical for air dropped systems.

In one embodiment, numerous (e.g., hundreds) homogeneous nodes are scattered randomly to cover an area. As an example, 500 nodes may cover an area of 200×600 meters. Each node is equipped with a processor, sensors (including cameras), a radio for short range networking (e.g. a mesh network), and a low-bandwidth satellite terminal. The system operates as follows when an intruder approaches the area:

1) A first node making a detection activates its camera and alerts other nodes in its vicinity (using a short-range radio network) to do the same.

2) All activated nodes use motion detection processing to look for the intruder/target.

3) Once a node captures imagery of the target assessed to be of sufficient quality, it compresses the image or video clip into a file.

4) The file is organized into sub-images or image segments tagged with a unique ID and transmitted point-to-multipoint or broadcast to m nearby nodes at a speed at least m times faster than the satellite terminal data rate.

5) Based on the unique ID, each of the m nodes transmits a different segment or different sub-set of segments using its satellite terminal. Protocols in the satellite messaging scheme are configured such that each terminal has a dedicated channel or time slot to avoid contention or collisions with transmissions from nearby nodes.

6) The satellite network delivers the segments to a remotely located control station via a network, e.g., the internet.

7) The control station reassembles the original image from the segments based on their unique IDs and decompresses the imagery for viewing.

Prior approaches to the problem of low-latency long-range image transmission from remote unattended sensors have generally relied on a so-called "Gateway" type of architecture. In this approach a special long range or satellite communications node called a Gateway handles external high bandwidth communications or image transmission. Weaknesses of this approach are large size, high cost, short battery life, air delivery difficulties, antenna aiming challenges, and poor fault tolerance. This last drawback can be overcome by equipping a large number or all nodes as Gateways but this compounds the cost, size, and lifetime problems.

A disclosed system includes a set of terminals or nodes deployable across an area, the nodes being configured and operative to self-form a mobile ad-hoc network for communication thereamong. The nodes include (1) imaging circuitry by which a node captures an image of a respective local sub-area based on a triggering event, (2) image-transfer circuitry by which a node partitions a captured image into a plurality of sub-images (image segments) and transmits the sub-images to respective other nodes, (3) image-transmission circuitry by which a node transmits on a respective uplink a respective sub-image received from another node. A relay (such as a satellite) is configured and operative, with multiple channels, to (1) receive transmissions of respective sub-images, in parallel on independent channels, from the nodes via respective uplinks, and (2) retransmit the sub-images to the remote location via a downlink. A control station at the remote location is configured and operative to (1) receive the sub-images from the relay via the downlink, (2) re-create the captured image by combining the received sub-images, and (3) utilize the re-created image in a monitoring or control operation of the control station.

The disclosed technique may be used in applications such as Remote Unattended Weapons and Unattended Ground Sensors (UGS).

Additionally, the invention could be applied to imagery transmission (or reception) by soldiers in a small unit such as a squad or platoon who lack access to high bandwidth communications. As in the unattended sensor/munition application, each soldier is equipped with local network communications and a low-bandwidth satellite terminal, which function as described above. In this case reception of imagery may be important. The remote control station compresses and breaks up the image into packets for parallel transmission to each soldier equipped with a terminal. Any or all of the soldier nodes can use the local network to decompress/compile the complete image for viewing or local distribution.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
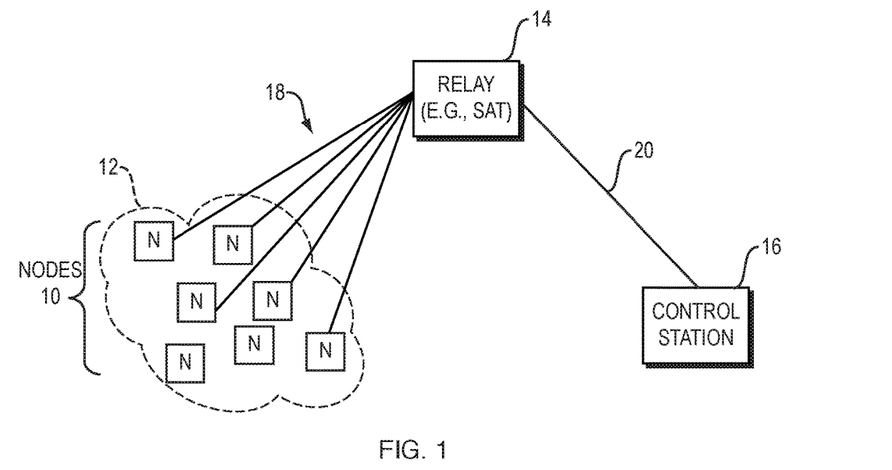
FIG. 1 is a block diagram of a networked system for transmission of imagery.

FIG. 1 is a block diagram of a networked system having a set of terminals or nodes 10 deployed in an area 12, a relay 14 such as an orbiting satellite (SAT), and a ground-based control station 16. As described more below, the nodes 10 are specialized terminal devices that capture images, segment the images into sub-images, and transfer and transmit the sub-images to the control station 16 via the relay 14. The nodes 10 are typically battery powered. The system includes communication channels 18 extending between the relay 14 and respective nodes 10, as well as a communication channel 20 extending between the relay 14 and the control station. Each channel 18, 20 generally has both uplink and downlink portions, i.e., separate portions for transmitting to and receiving from the relay 14. In one use, image data is transmitted from the nodes 10 to the relay 14 on the uplink portion of channels 18, and from the relay 14 to the control station 16 on a downlink portion of the channel 20. As mentioned, the system may alternatively be applied to image transmission in the other direction, i.e., from a remote location to the nodes 10. Such operation can support image reception by soldiers in a small unit such as a squad or platoon who lack access to high bandwidth communications.

The nodes 10 may be deployed in the area 12 in any of a variety of manners. One useful method is air-based delivery, i.e., dropping the nodes 10 from an airplane or helicopter in a manner that scatters the nodes 10 across the area 12. Both the size of the area 12 and the density of the nodes 10 therein may vary, depending on several factors. As described more below, in one embodiment the nodes 10 are weapons such as anti-personnel mines, while in other embodiments the nodes 10 may provide specialized sensing functionality. The nature of the mission as well as the capabilities of the nodes 10 (range of action/sensing, etc.) are examples of relevant factors dictating the size of the area 12 and node density.

The nodes 10 are configured and operative to self-form a mobile (i.e., wireless) ad-hoc network for communication among themselves. Different types of wireless formats and protocols may be employed. The network may employ a set of point-to-point links or a shared-medium arrangement such as a broadcast format. If point-to-point links are used, they may realize different types of topologies, such as mesh, star, etc. These are all non-limiting examples.

As described more below, each node 10 generally includes (1) imaging circuitry by which a node 10 captures an image of a respective local sub-area based on a triggering event, (2) image-transfer circuitry by which a node 10 partitions a captured image into a plurality of sub-images and transmits the sub-images to respective other nodes 10, and (3) image-transmission circuitry by which a node transmits to the relay 14 (on a respective uplink) a respective sub-image received from another node 10. The relay 14 is configured and operative to (1) receive transmissions of respective sub-images, in parallel on independent channels 18, from the nodes 10, and (2) retransmit the sub-images to the control station 16 via the channel 20. The control station 16 will generally be located remotely from the area 12, and is configured and operative to (1) receive the sub-images from the relay 14 via the channel 20, (2) re-create the captured image by combining the received sub-images, and (3) utilize the re-created image in a monitoring or control operation of the control station 16. In one example described below, this includes displaying the image to an operator who extracts information that is useful in carrying out the mission. In the anti-personnel mine example, this can include identifying presence of enemy personnel in the area 12, as a condition to initiating detonation of one or more munitions included as part of the nodes 10.

Referring again to the deployment of the nodes 10, in one embodiment the nodes are configured for ground emplacement, e.g., by inclusion of a stake, legs, or other analogous structure. Such nodes may initially be include in respective capsules for the air-dropping operation, with each capsule automatically separating from the rest of the respective node 10 upon encountering the ground. The separating or discarding of the capsule provides a desired exposure of the node 10 to an immediately surrounding portion of the area 12, for acquisition of images. Alternatively, the nodes 10 may be configured to be carried by respective members of a group operating in the area 12, such as members of a combat unit. In this case the nodes 10 may be part of a device or equipment used by a combat troop, such as a radio, etc.

Figure 2:
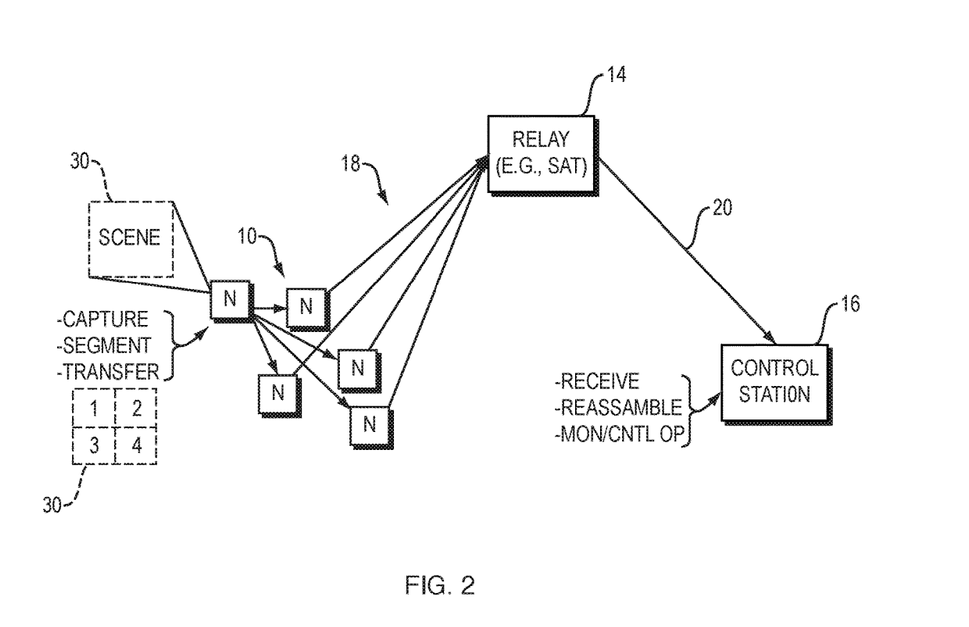
FIG. 2 is a block diagram of the system showing aspects of operation.

FIG. 2 is a simplified schematic illustration of image capture, transfer, and transmission as outlined above. One of the nodes 10 captures an image 30 of a scene in a local area of the node 10. The image 30 may be a standalone image or part of a sequence of images, including for example a real-time video stream. The node 10 segments the image 30 into four sub-images 1-4 as shown, and transfers these sub-images to respective other nodes 10 for transmission to the relay 14. The relay 14 re-transmits the sub-images to the control station 16 via the channel 20. The control station 16 receives the sub-images, reassembles them to reconstruct the original image 30, and then performs a monitoring and/or control operation (MON/CNTL OP) using the reconstructed image. As mentioned, this operation might include displaying the reconstructed image to an operation located at the control station 16.

A significant aspect of the above operation is the ability to transmit a large image 30 to the remote control station 16 without requiring a high-bandwidth uplink to the relay 14 and all the attendant costs and complications. The nodes 10 may be of modest size and power and utilize relatively low-bandwidth uplinks, e.g., 2-20 kilobits per second. Because a number of nodes 10 can be used in parallel, the effective transmission bandwidth is much higher, i.e., a multiple of the individual node uplink bandwidth. If the individual node bandwidth is 10 kilobits/sec and the image is segmented into 20 sub-images, for example, the net transmission bandwidth for sending the image is 200 kilobits/sec. Higher bandwidth translates to lower latency and faster overall response time of the system to events in the area 12, without requiring a large and expensive ground terminal for transmitting imagery to the control station 16 via the satellite 14.

Generally, the nodes 10 may all be identical or there may be some variability in their functionality. The basic functions include image capture and segmentation, transfer of sub-images to other nodes, and receiving sub-images from other nodes and transmitting them to the relay 14. In one example, all nodes 10 have all of these functions. In another example, not all nodes 10 may have all functions. Some nodes 10 may be limited to image capture and segmentation along with transfer to other nodes 10, and not be capable of transmitting sub-images to the relay 14. Some nodes 10 may be limited to receiving sub-images and transmitting them to the relay 14, and lack the functions of local image capture, segmentation, and transfer of sub-images to other nodes 10.

Regarding the local transfer of sub-images, the nodes 10 may select the other nodes 10 to receive the sub-images based in part on balancing power usage across the nodes 10 of the system. If the system has 100 nodes and each image is segmented into ten sub-images, for example, the sub-images for different images might be distributed among different sets of ten nodes, so that all the nodes are utilized in a balanced manner and experience relatively similar incremental power usage for transmitting to the relay 14.

The nodes 10 may be capable of inter-communicating their respective abilities to communicate with the relay 14, and the nodes 10 might select nodes 10 to receive sub-images based in part on the communicated abilities of the nodes 10 to communicate with the relay 14. As an example, if a given node 10 is emplaced in a manner preventing it from establishing a clear radio link with the relay 14, that node 10 communicates this limitation to the other nodes 10, which then can avoid using that node 10 for transmitting sub-images to the relay 14. The nodes 10 may employ directional antennas for increased resistance to jamming by off-axis jammers when the antenna is desirably aligned for communication with the relay 14. In this case the communicated abilities of the nodes 10 might include indications of presence or absence of jamming.

Additionally, nodes 10 may be selected to receive sub-images based in part on minimizing network delays (e.g., the need for multiple "hops" traversing multiple nodes) and/or avoiding inoperative nodes 10. The nodes 10 may maintain the mobile ad-hoc network in a dynamic manner that provides for graceful degradation of the network as nodes lose ability to operate.

Figure 3:
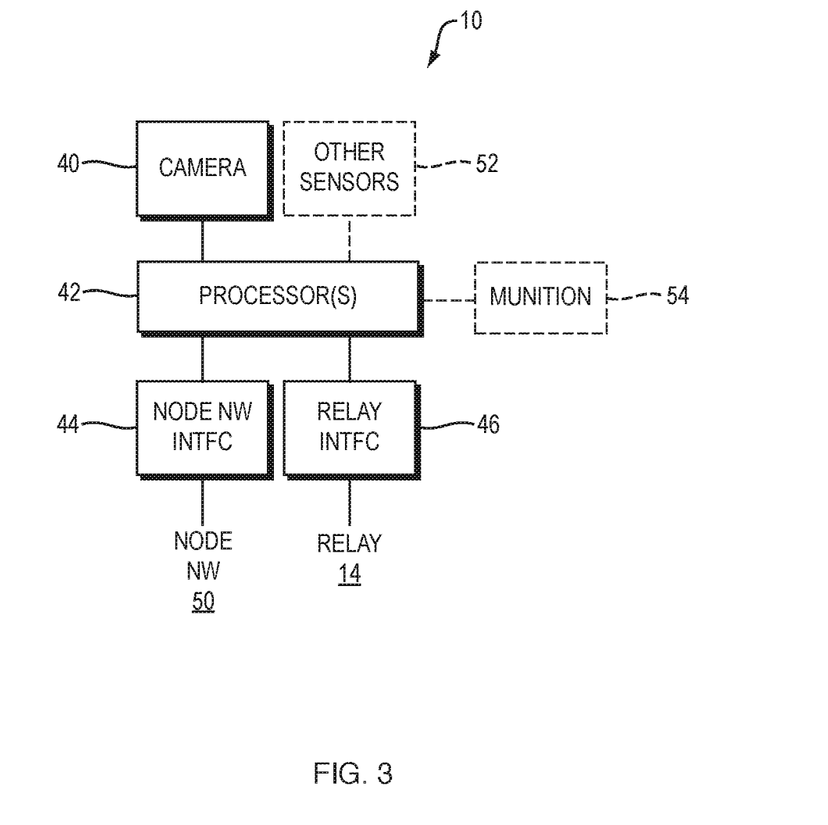
FIG. 3 is a block diagram of a terminal, also referred to as a node.

FIG. 3 is a block diagram of a node 10. It includes a camera 40, processor(s) 42, a node network interface (NODE NW INTFC) 44, and relay interface (RELAY INTFC) 46. The node network interface 44 provides electrical and functional interconnection with the mobile, ad-hoc inter-node network referred to as the "node network" 48. It thus includes a wireless transceiver and antenna for transmitting and receiving wireless signals to/from other nodes 10. The relay interface 46 provides electrical and functional interconnection with the relay 14, and thus includes a transceiver and antenna for transmitting and receiving RF signals to/from the relay 14. The illustrated configuration supports all of the imaging-related functions of image capture and segmentation, transfer of sub-images to other nodes 10, and receiving sub-images from other nodes 10 and transmitting them to the relay 14. In this respect, the illustrated components (including the processors 42 executing appropriate computer program instructions) realize (1) imaging circuitry by which the node captures an image of a respective local sub-area based on a triggering event (example below), (2) image-transfer circuitry by which a node partitions a captured image into a plurality of sub-images and transmits the sub-images to respective other nodes, (3) image-transmission circuitry by which a node transmits on a respective uplink a respective sub-image received from another node.

As indicated in dashed lines, a node 10 may also include other components depending on the exact application. In one application the nodes 10 serve primarily a remote sensing function, and thus include other sensors 52 beyond the camera 40. An example includes so-called "unattended ground sensors" or UGS system. The other sensors 52 might include acoustic sensors, seismic sensors, etc. In another application a node 10 may include a munition 54 such as an explosive charge and detonator in a desired configuration (e.g., as an anti-personnel mine). In this case, the munition may be activated by remote control from the control station 16, including delivery of a detonation signal to the node 10 via the channel 20 and the node-specific channel 18.

Figure 4:
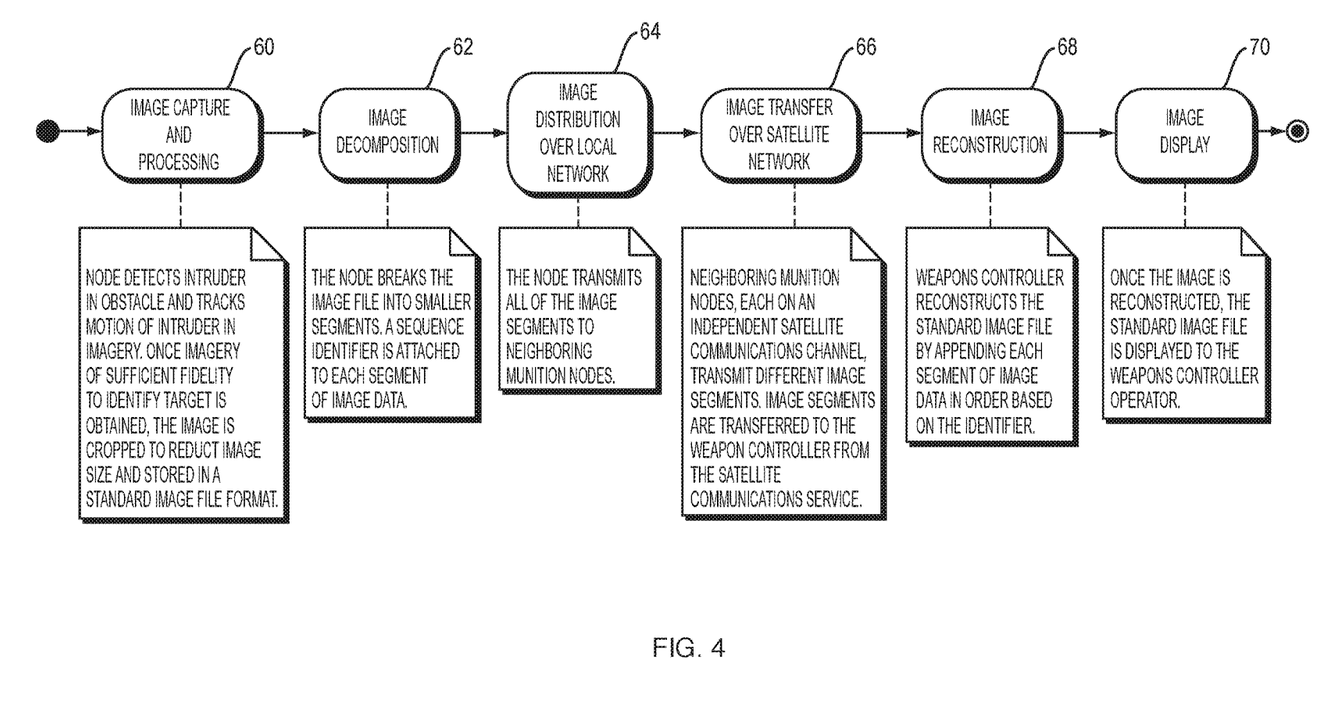
FIG. 4 is a flow diagram of operation related to image capture, transmission, and display.

FIG. 4 is a flow diagram of operation related to image capture, transmission, and display. In a small scale example, a total of 33 nodes 10 may be controlled by a weapons controller. The system operates as shown in FIG. 4 when an intruder enters the area 12. Each step is described in detail in following paragraphs.

Image Capture and Processing 60

Figure 5:
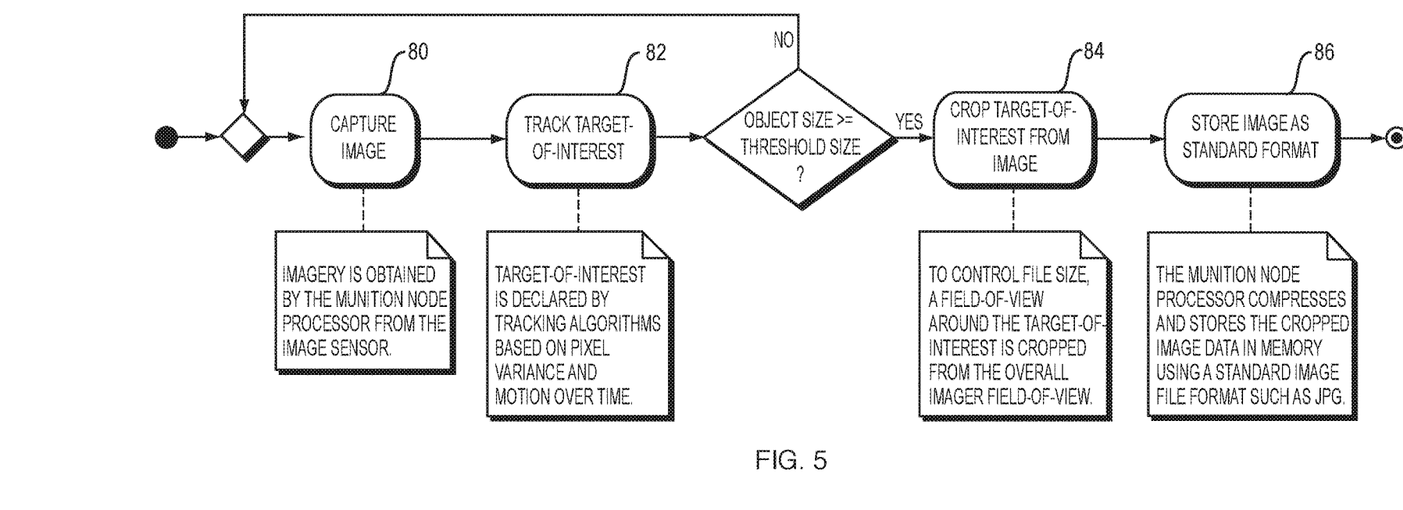
FIG. 5 is a flow diagram of details of image capture and storage.

At step 60 of FIG. 4, once the intruder enters the area 12 and is detected, each node 10 turns on image sensors and begins scanning for targets-of-interest in the field of view. FIG. 5 shows the image capture and processing overview. At 80 the image is captured, e.g. by the camera 40. At 82, using pixel variance and pixel motion, the node processor tracks the intruder, or target-of-interest. As the target-of-interest approaches or passes by the node, the node processor compares the major dimension of the object size (pixels-on-target) to predetermined threshold values for target classes. Upon reaching the threshold size for target identification by the operator, the node processor proceeds to crop the image (step 84). The bounding box, or outline, around the target-of-interest from the tracking algorithm provides the basis for cropping the target-of-interest from the overall image to reduce the image data transferred to the weapon controller. After cropping the image, the cropped image is compressed and stored in memory (step 86) using a standard image format, such as a jpg, that can be displayed by most computers. The resulting image is approximately 20 KB or less in size.

Image Decomposition 62

Figure 6:
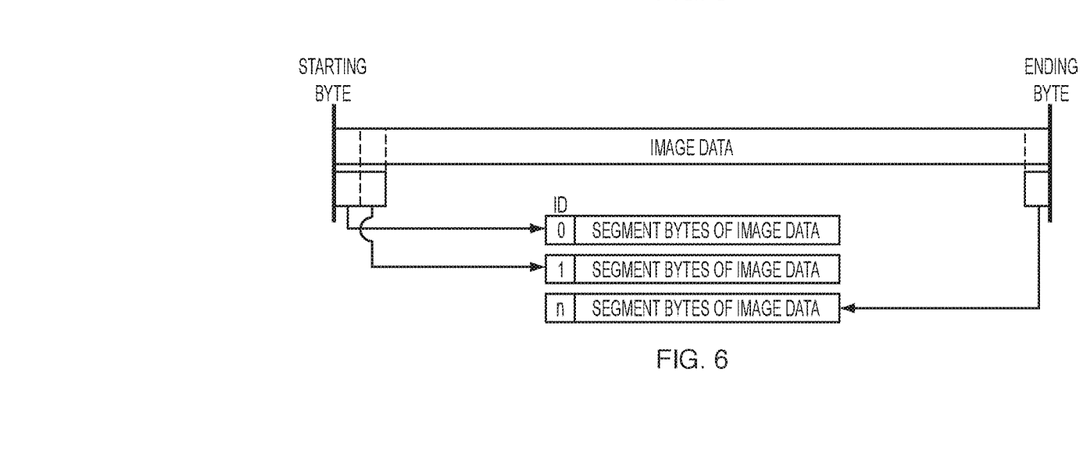
FIG. 6 is a schematic diagram of image segmentation.

At step 62 of FIG. 4, the node processor breaks the image file into segments (sub-images or sets of image bytes) as shown in FIG. 6 (image file decomposition). This step is necessary to allow different pieces of the image file to be transmitted by neighboring nodes 10 in a later step in the image transfer process. The identifier is necessary to facilitate reconstitution of the complete image file by the controller so that the image file can be displayed. Decomposition of the image file may occur at the originating node processor, neighboring node processors after receiving the image data over the local wireless network, or a combination thereof depending on the optimal packet size for the local wireless network. The number of segments depends on the total image file size. A 20 kilobyte image size results in approximately 72 segments.

Image Distribution Over Local Network 64

Figure 7:
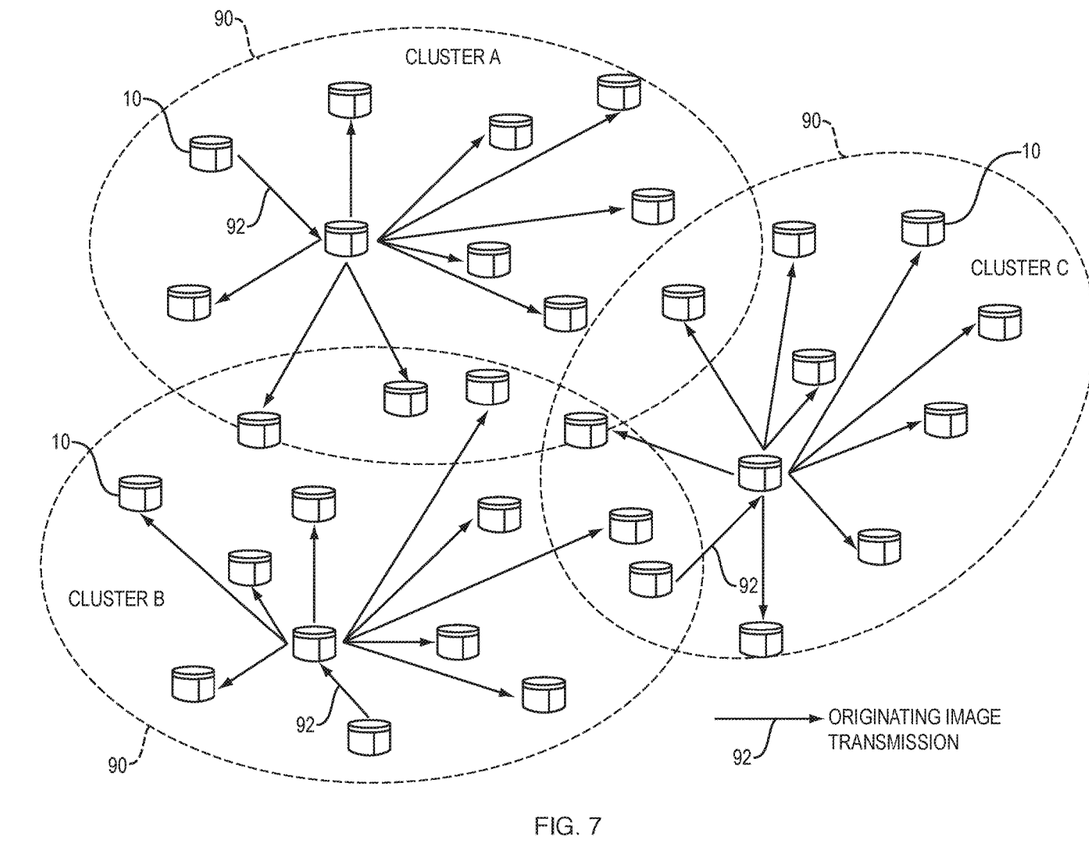
FIG. 7 is a block diagram of the system with nodes organized into clusters.

At step 64 of FIG. 4, all image segments are transmitted by the originating node 10 over the local wireless network 50 to neighboring nodes. This may be done using Time Domain Managed Access (TDMA) in a star topology for example. The nodes 10 may be split into clusters as depicted in FIG. 7 (Transmission of Segmented Image Data over Local Wireless Network). In the assumed example of a 33-node system, the 33 nodes are split into clusters of eleven nodes each, resulting in three separate local wireless networks 90 as shown in FIG. 7. Reference 92 indicates the originating image transmission. The clustering of nodes could be scaled to 500 or more. The local wireless network data rate provides greater than 10 times the data rate of a single low bandwidth satellite radio. As a result, all neighboring nodes within a cluster have sufficient image segments in less than a second to begin transmission over their satellite radios once authorized by the weapon controller. The local distribution of image data occurs in parallel with a request to the weapons controller to transfer the image over the satellite communications. Image transfer over the local wireless network continues in parallel with the satellite transmission as necessary to complete the distribution of image data to neighboring nodes.

Image Transfer Over Satellite Network 66

At step 66 of FIG. 4, a weapons controller (e.g., at the control station 16) manages which cluster of munitions will transmit image data at a given time. This authorization process begins in parallel with the image distribution when the originating node 10 sends a request to the weapons controller to initiate the satellite network transfer. The weapons controller authorizes the image transfer which results in the available satellite channels/nets being allocated to the cluster performing the image transfer. Once the transfer is complete, the weapons control station can allocate the satellite radio channels/nets to a different cluster to receive an image from one of the nodes.

Figure 8:
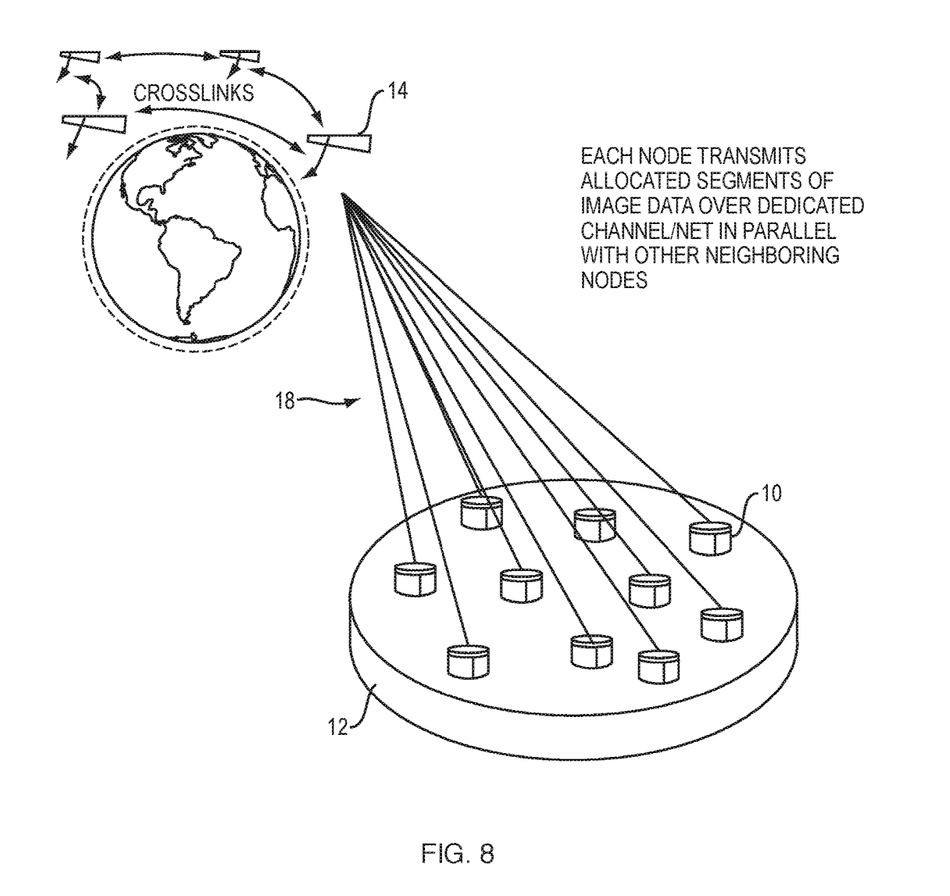
FIG. 8 is a schematic depiction of transmission of sub-images to a relay such as a satellite.

In the assumed example, the nominal number of transmitting nodes may be ten, with the eleventh node in the cluster dedicated to sending and receiving command and control messages. Logic in each of the node processors tracks the condition of the neighboring nodes on the local wireless network. Depending on the associated hierarchy of node identifiers and the number of active nodes in the cluster, each neighboring node begins transmitting their respective image segments based on the segment identifiers. Each node 10 uses a different channel/net 18 on the satellite radio to perform its transmission, as shown in FIG. 8 (Parallel Transmission of Segmented Image Data over Satellite Network). As a result the effective uplink data rate is increased by a factor directly related to the number of active nodes and reduces the time to complete the image transfer by a similar factor. In the case of 72 segments and ten nodes, each node transfers at least seven segments over its channel/net resulting in the segments being transmitted ten times faster than a single node transmitting all 72 segments.

Data streams from each transmitting node are relayed through the satellite network to a ground-based control station 16. There, the image data is transferred to the weapon controller through a virtual private network (VPN) over a broadband internet connection or other broadband network bridge.

Image Reconstruction 68

At step 68 of FIG. 4, as the weapon controller receives image segments, the controller reconstructs the image data file by placing the received bytes in their respective order using the segment identifiers. Once all segments are received and the bytes of image data have been placed in order, the image reconstruction process is complete.

Image Display 70

At step 70 of FIG. 4, the reconstructed image is displayed to the operator by the weapons controller. The operator uses the image and subsequent images, if necessary, to determine whether the personnel target-of-interest is hostile. This determination can inform a decision whether to detonate nodes 10, and if so then the weapons controller generates the detonation signal(s) and transmits them to the appropriate nodes 10.

While various embodiments of the invention have been particularly shown and described, it will be understood by those skilled in the art that various changes in form and details may be made therein without departing from the scope of the invention as defined by the appended claims.

What is claimed is:

1. A system, comprising:
a set of nodes deployable across an area, the nodes being configured and operative to self-form a mobile ad-hoc network for communication there among, the set including nodes having (1) imaging circuitry by which a node captures an image of a respective local sub-area based on a triggering event, (2) image-transfer circuitry by which a node partitions a captured image into a plurality of sub-images and transmits the sub-images to respective other nodes via the mobile ad-hoc network, (3) image transmission circuitry by which a node transmits on a respective uplink a respective sub-image received from another node, the sub-images being transmitted with corresponding sub-image identifiers usable to reassemble the image from the sub images;
a relay coupled to the nodes by respective uplinks, the uplinks used to communicate the sub-images and sub-image identifiers from the nodes to the relay, the relay being configured and operative, with multiple channels, to (1) receive transmissions of respective sub-images of a captured image, along with the respective sub-image identifiers, in parallel on independent channels, from the nodes via respective uplinks, and (2) retransmit the sub-images to the and sub-image identifiers to a remote location via a downlink; and
a control station at the remote location, the control station being coupled to the relay by the downlink, the downlink being used to communicate the sub-images and sub-image identifiers from the relay to the control station, the control station being configured and operative to (1) receive the sub-images for the captured image along with the sub-image identifiers from the relay via the downlink, (2) re-create the captured image by combining the received sub-images according to the sub-image identifiers, and (3) utilize the re-created image in a monitoring or control operation of the central control station.

2. The system of claim 1, wherein the relay is an orbiting satellite and the nodes are battery-powered satellite terminals.

3. The system of claim 1, wherein the nodes include (1) munitions and (2) detonation circuitry operative to detonate the munitions in response to respective detonation signals received from the control station via the relay.

4. The system of claim 3, wherein the monitoring or control operation of the control station includes (1) verifying, based on the re-created image, presence of enemy personnel in the area, and (2) providing one or more of the detonation signals to respective nodes to detonate the respective munitions against the enemy personnel.

5. The system of claim 3, wherein the nodes are configured as anti-personnel weapons.

6. The system of claim 1, wherein the nodes are first nodes including the image-transmission circuitry, and wherein the system further includes second nodes lacking the image-transmission circuitry and thus unavailable to other nodes for transmitting sub-images to the relay, the second nodes including the imaging circuitry and image-transfer circuitry for capturing images and transferring sub-images to other nodes for transmission to the relay.

7. The system of claim 1, wherein the nodes are first nodes including the imaging circuitry and image-transfer circuitry, and wherein the system further includes second nodes including the image-transmission circuitry while lacking the imaging circuitry and image-transfer circuitry, the second nodes being available to other nodes for transmitting sub-images to the relay.

8. The system of claim 1, wherein the nodes are unattended ground sensor nodes including sensors for non-imaging sensing in the area.

9. The system of claim 8, wherein the sensors include acoustic or seismic sensors.

10. The system of claim 1, wherein the image-transfer circuitry is configured and operative to select nodes to receive the sub-images based in part on balancing power usage across the nodes of the system.

11. The system of claim 1, wherein the nodes intercommunicate their respective abilities to communicate with the relay, and the image-transfer circuitry is configured and operative to select nodes to receive the sub-images based in part on the communicated abilities of the nodes to communicate with the relay.

12. The system of claim 11, wherein the image-transmission circuitry of each node includes a directional antenna for increased resistance to jamming by off-axis jammers when the antenna is desirably aligned for communication with the relay, and wherein the communicated abilities of the nodes include indications of presence or absence of jamming.

13. The system of claim 1, wherein the image-transfer circuitry is configured and operative to select nodes to receive the sub-images based in part on minimizing network delays and/or avoiding inoperative nodes.

14. The system of claim 1, wherein the nodes maintain the mobile ad-hoc network in a dynamic manner providing for graceful degradation of the network as nodes lose ability to operate.

15. The system of claim 1, wherein the nodes are configured for ground emplacement in the area.

16. The system of claim 15, wherein each node originates from a respective capsule air-dropped into the area, the capsule being automatically discarded during emplacement to provide desired exposure of the node to an immediately surrounding portion of the area.

17. The system of claim 1, wherein the nodes are configured to be carried by respective members of a group operating in the area.

18. The system of claim 17, wherein the group is a combat unit and the nodes are part of military devices used by the members of the combat unit.

19. The system of claim 5, wherein at least some of the nodes are further configured and operative to:
upon detecting entry of an intruder into an immediate area, turn on image sensors and begin scanning for targets-of-interest in a field of view;
performing image processing to track a target-of-interest and to obtain an image of the target-of-interest based on its size compared to predetermined threshold values for target classes, the obtained image being further processed to generate the captured image provided to the image-transfer circuitry.

* * * * *